US010567073B2

(12) United States Patent
Le Pera et al.

(10) Patent No.: US 10,567,073 B2
(45) Date of Patent: Feb. 18, 2020

(54) COMMUNICATION DEVICE FOR PROCESSING INTERFERENCE BETWEEN SIGNALS TRANSMITTED IN NEIGHBOURING TRANSMITTING SPOTS, METHOD ASSOCIATED THEREWITH

(71) Applicant: EUTELSAT S A, Paris (FR)

(72) Inventors: Alessandro Le Pera, Issy-les-Moulineaux (FR); Jean-Paul Courson, Montuaban (FR); Laurent Roux, Toulouse (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 16/020,184

(22) Filed: Jun. 27, 2018

(65) Prior Publication Data

US 2019/0013861 A1 Jan. 10, 2019

(30) Foreign Application Priority Data

Jun. 28, 2017 (FR) ...................................... 17 55966

(51) Int. Cl.
*H04B 7/185* (2006.01)
*H04B 17/336* (2015.01)
(Continued)

(52) U.S. Cl.
CPC ......... *H04B 7/2041* (2013.01); *H04B 17/102* (2015.01); *H04B 17/345* (2015.01); *H04W 52/143* (2013.01)

(58) Field of Classification Search
CPC .. H04B 7/2041; H04B 17/102; H04B 17/345; H04B 7/18517; H04W 52/143
See application file for complete search history.

(56) References Cited

U.S. PATENT DOCUMENTS 6,157,811 A 12/2000 Dent
7,317,916 B1 1/2008 Chang et al.
(Continued)

FOREIGN PATENT DOCUMENTS

WO WO 2016/170282 A1 10/2016

OTHER PUBLICATIONS

Search Report as issued in French Patent Application No. 1755966, dated Mar. 5, 2018.

*Primary Examiner* — Dong-Chang Shiue
(74) *Attorney, Agent, or Firm* — Pillsbury Winthrop Shaw Pittman LLP (57) ABSTRACT

A communication device for transmitting a plurality of wanted signals to a satellite from a transmitter, each of the wanted signals transmitted by the device being for being addressed to a given transmitting spot, the device including a set of reference values of powers and phases of at least a first reference signal received at different points of at least one transmitting spot, a first wanted signal generating an interfering signal in a neighbouring spot, the transmitter generating at least one wanted neighbouring signal in a neighbouring spot of the first spot, the transmitter generating a first correcting signal from the first signal transmitted and at least a first phase value and a first power value of a set of reference values, the transmitter transmitting a combination of the correcting signal and of the neighbouring signal in order to generate a corrected neighbouring signal.

13 Claims, 5 Drawing Sheets

(51) Int. Cl.
*H04B 17/345* (2015.01)
*H04B 7/204* (2006.01)
*H04B 17/10* (2015.01)
*H04W 52/14* (2009.01)

(56) References Cited

U.S. PATENT DOCUMENTS

| | | |
|---|---|---|
| 2010/0221997 A1 | 9/2010 | Craig et al. |
| 2016/0095095 A1* | 3/2016 | Lorca Hernando .......................... H04W 72/042 370/329 |
| 2018/0019799 A1* | 1/2018 | Potter ................ H04B 7/18513 |

* cited by examiner

FIG.6B

COMMUNICATION DEVICE FOR PROCESSING INTERFERENCE BETWEEN SIGNALS TRANSMITTED IN NEIGHBOURING TRANSMITTING SPOTS, METHOD ASSOCIATED THEREWITH

CROSS REFERENCE TO RELATED APPLICATIONS

This application claims priority to French Patent Application No. 1755966, filed Jun. 28, 2017, the entire content of which is incorporated herein by reference in its entirety.

FIELD

The present invention relates to the field of communication devices such as communication gateways transmitting signals from a ground station to a satellite. The invention is concerned with the field of transmissions conveying a plurality of wanted signals to a satellite to retransmit the same in communication channels dedicated to a plurality of terrestrial geographical spots. More particularly, the invention deals with devices and methods processing communications in order to reduce interference from communications sharing common frequency bands and for covering neighbouring transmitting spots.

BACKGROUND

Currently, broadcasting satellites enable a plurality of wanted signals to be broadcast or transmission channels to be set in different transmitting spots in order to cover particular geographical zones. The channels are set, on the one hand, between the satellite and, on the other hand, terrestrial spots. The signals to be broadcast generally come from a terrestrial gateway, transmitting the data to be transmitted to the satellite via uplink channels.

Figure 1:
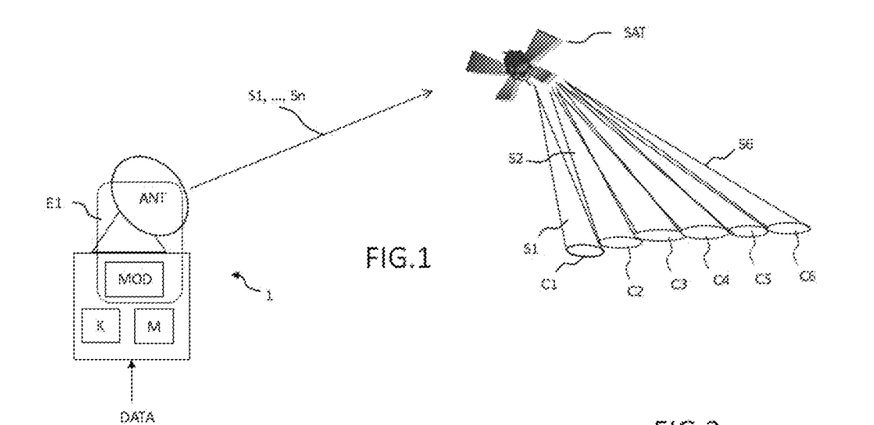
FIG. 1: a configuration of a device of the invention having a gateway function to communicate with a communication satellite.

FIG. 1 represents a configuration enabling a solution of prior art and that of the invention to be described. The satellite SAT includes a receiver for receiving signals from the gateway such as a receiving antenna and a processor for processing the received signals to be broadcast according to geographical zones. The satellite SAT is capable of generating a plurality of transmitting cones in order to cover a particular terrestrial zone, having in particular an interest in terms of population. The geometry of the transmitting cones is configured from a given antenna pointing. A transmitting cone is also called "beam" or coverage beam in literature. This is also called a transmitting spot insofar as a beam covers a spot corresponding to a geographical zone covered by the beam.

Such a broadcasting satellite SAT enables spots covering a complex geographical zone such as a part of the terrestrial surface that can form a line or curve and even a closed shape to be defined.

Figure 2:
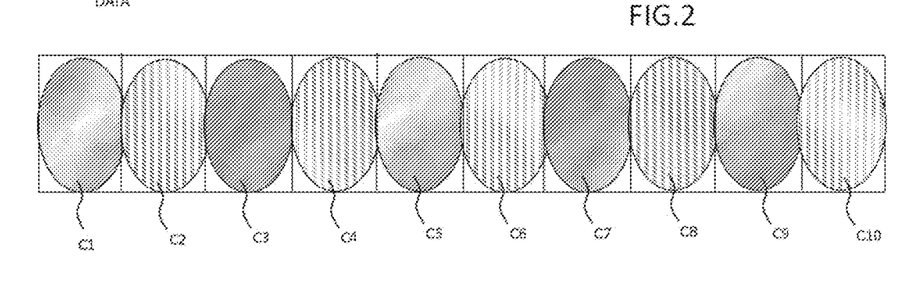
FIG. 2: a set of transmitting spots of a satellite covering a terrestrial geographical zone.

FIG. 2 represents about ten transmitting spots from a same satellite SAT. The spots $C_i$ are numbered from $C_1$ to $C_{10}$.

A given geographical zone is covered by a transmitting spot, in particular such that terminals of this geographical zone can receive, demodulate and decode the base band signal.

The signals are transmitted in spots dedicated to a defined geographical zone. The latter are arranged so as to cover contiguous zones and define adjacent surfaces or cones. The satellite SAT makes it possible to affect to adjacent spots, frequency channels which are defined in different frequency bands and chosen so as to limit interference, intermodulation, or cross-modulation effects that can generate parasitic signals in neighbouring spots. However, by taking the satellite resources into account and optimising the bandwidth in each spot, the frequency used for a spot are reused for a spot not immediately neighbouring but adjacent to a neighbouring spot. Thus, according to the example of FIG. 2, spots $C_1$, $C_3$, $C_5$, $C_7$ and $C_9$ share the same frequency band B1 and spots $C_2$, $C_4$, $C_6$, $C_8$ and $C_{10}$ share the same frequency band B2 which is different from B1. But, a problem comes from the fact that transmissions dedicated to a given spot can cover, even if decreased, a zone close to the zone covered by the given spot.

Indeed, a problem arises from interference between two neighbouring spots but which are not directly adjacent, for example $C_2$ and $C_4$, the wanted signals of which transmitted in one of them can cause interference in the neighbouring spot and vice versa.

Figure 3A:
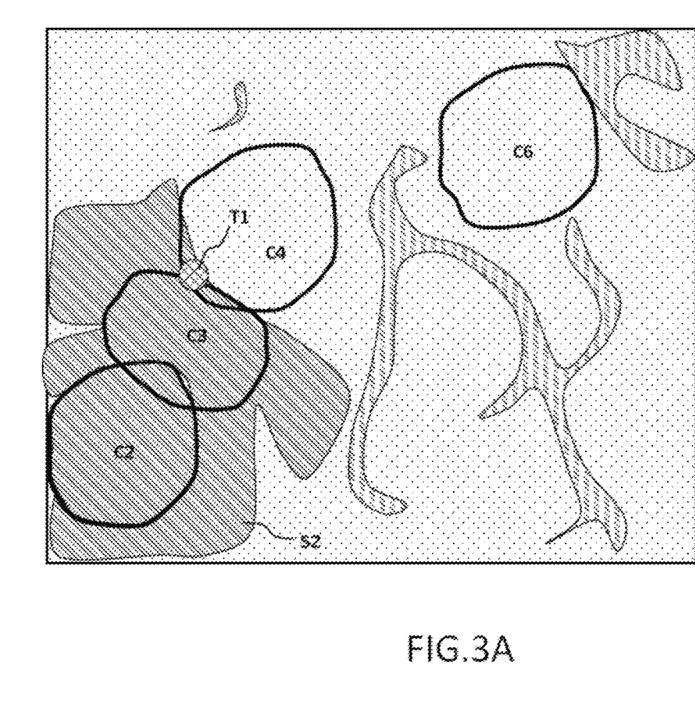
FIG. 3A: an example of representation of the power level of the interference generated by the transmission of a wanted signal in spot 2 and measured from spot 4 without the implementation of the device of the invention.

When a terminal is mobile, such as an aircraft, and that the latter switches from one zone to another, interference effects can occur at the terminal receiver. FIG. 3A illustrates a mobile terminal $T_1$ switching from zone $C_4$ to zone $C_3$ towards zone $C_2$. In this zone, the terminal $T_1$ is more sensitive to the signals transmitted in spot $C_2$ which can be received in spot $C_4$, the coverage of which is noted $S_{24}$. The signals are viewed by the terminal $T_1$ as interference, noted $S_{24}$. The terminal $T_1$ can then undergo a significant degradation in the signals received by the receiving channel.

A problem exists in that the measured interference level can sometimes disturb the signals dedicated to a terminal when it is located in some positions of a spot likely to be exposed to interference due to the signals intended to neighbouring spots.

SUMMARY

Aspects of the invention enables the abovementioned drawbacks to be overcome.

According to an aspect of the invention, there is provided a communication device for transmitting a plurality of signals to a satellite from a transmitter, the transmitter including at least one transmitting antenna and a modem, each of the signals transmitted by the device being for being addressed to a given transmitting spot via the satellite, a transmitting spot having a predefined geographical coverage of an antenna of the satellite, the device including a memory including a set of reference values of powers and phases of at least a first reference signal received at different points of at least one transmitting spot, a first wanted signal being transmitted in a first spot and being likely to generate (or generating) an interfering signal in a neighbouring spot, the transmitter generating at least one wanted neighbouring signal for being transmitted in a neighbouring spot of the first spot and being likely to be disturbed (or being disturbed) by the interfering signal, the transmitter generating a first correcting signal from the first transmitted signal and at least a first phase value and a first power value of the set of reference values, the phase and power values being chosen depending on at least one determined geographical position in the neighbouring spot, the transmitter transmitting a combination of the first correcting signal and of the wanted neighbouring signal in order to generate a corrected neighbouring signal to the satellite, the corrected neighbouring signal being for being transmitted in the neighbouring spot.

According to an embodiment, at least one part of the first signal and at least one part of the neighbouring signal are included in a same frequency band.

According to an embodiment, the set of reference values includes, for a set of given positions covering at least one neighbouring spot of a first spot:
- a received power value of a first reference signal for each of the given positions,
- a phase value of the first reference signal received for each of the given positions;
- a reference ratio between a power of a reference signal transmitted in the neighbouring spot and a power of a second reference signal transmitted in the first spot, the ratio being calculated for the set of the given positions.

According to an embodiment, the first correcting signal is determined depending on the reference values of the determined geographical position and of a plurality of further positions in the neighbouring spot.

According to an embodiment, the values of the reference ratio lower than at least one threshold for a set of given positions of a same geographical region define at least one critical zone of a spot.

According to an embodiment, the calculator automatically determines a command to generate a first correcting signal when the determined geographical position is in a critical zone or when the value of the reference ratio is lower than a threshold at the determined geographical position.

According to an embodiment, the calculator further conditions the generation of the command of a first correcting signal to the value of a criterion calculated depending on the power and/or phase values of the wanted signal transmitted in the neighbouring spot and of the wanted signal transmitted in the first spot by the transmitter E1.

According to an embodiment, the calculator automatically determines the power and/or phase values of the wanted signal transmitted in the neighbouring spot and of the wanted signal transmitted in the first spot by the transmitter E1 depending on the proximity of the determined geographical position with positions at which the reference ratio is lower than a threshold.

According to an embodiment, the calculator generates a correcting signal upon receiving information indicating the presence of a terminal in the proximity of a determined geographical position.

According to an embodiment, the phase of the first correcting signal substantially corresponds to the opposite phase of the phase of a reference signal received at or substantially close to the given geographical position and recorded in the memory.

According to an embodiment, the amplitude of the first correcting signal is calculated depending on the power value of the first reference signal received at the determined geographical position and recorded in the memory.

According to an embodiment, the determined geographical position corresponds to an antenna direction of the satellite relative to a reference orientation, the direction being coupled with a known mean distance of the satellite for calculating a gain and a phase of the reference signal.

According to another aspect, the invention relates to a method for processing interference including the following steps of:
- acquiring a first position from an input interface and a calculator;
- generating a first wanted signal to a first spot likely to create (or creating) interference on a neighbouring spot, the first wanted signal being sent by a communication device and passing through a satellite;
- generating a neighbouring wanted signal for being transmitted in a neighbouring spot of the first spot and passing through a satellite;
- generating a first correcting signal from:
  - the first wanted signal;
  - a phase value associated with the first given position;
  - a power value associated with the first given position,
  the power and phases values being chosen from a predefined set of reference values,
- generating and transmitting a corrected neighbouring signal to the neighbouring spot of the first spot and passing through a satellite, the corrected neighbouring signal being obtained by a linear combination of the neighbouring signal and of the correcting signal.

BRIEF DESCRIPTION OF THE FIGURES

Further characteristics and benefits of the invention will appear upon reading the detailed description that follows, in reference to the appended figures, which illustrate.

DETAILED DESCRIPTION

Gateway

FIG. 1 represents a telecommunication gateway 1 enabling data to be transmitted to a set of geographical spots noted $C_1$ to Cn in the present application through a broadcasting satellite SAT. In the example of FIG. 1, six spots $C_1$ to $C_6$ are represented. Each geographical spot $C_i$ is addressed by a channel in which a signal Si is transmitted. The channel is in particular defined by a frequency and a bandwidth.

The communication gateway 1 includes an antenna for transmitting a wanted signal associated with a given geographical coverage, the signals are noted $S_{11}$ to $S_{NN}$ when they are respectively addressed to spots $C_1$ to $C_N$ and received at these spots. The antenna ANT is associated with a modulator MOD and possibly a multiplexer not represented. These transmitting elements form the transmitter E1. The transmitter E1 can further comprise an amplifier, filters, a coder, an oscillator and more generally all the elements enabling a modulated carrier including a base band signal to be generated, to code data or any other types of signals. According to an embodiment, the device includes a plurality of modulators enabling a plurality of output signals for being transmitted by the satellite to be modulated and generated in a plurality of given spots.

A signal RF is generated for a given spot. According to an embodiment, the gateway 1 comprises a multiplexer for multiplexing the signals RF and for amplifying the latter in order to transmit them to the satellite SAT.

In practice, the gateway can encode in a same transmitting channel, different wanted signals associated with different given geographical coverages for example from the multiplexer.

According to an embodiment of the invention, the gateway 1 includes at least one memory M (or non-transitory computer readable medium) enabling reference data and possibly any data that can be exploited to be stored upon setting communications of the gateway 1 such as transmission configurations, encryption data or encoding data enabling transmission channels to be set, etc.

According to an embodiment, the memory M comprises calibration data related to the antenna radiation pattern associated with a plurality of geographical positions or geographical zones. These values are collected during test and calibration phases of at least one antenna of the satellite SAT. The values are normalised from at least one reference signal $S_R$ transmitted by the satellite SAT. According to an embodiment, the values characterising the pattern of at least one antenna ANT comprise received power values $\Phi_R(POS_k)$ of the reference signal $S_R$ in a set of positions $POS_k$ or zones. Further, the reference values comprise phase shift values $\Phi_R(POS_k)$ of the signals received from the reference signal $S_R$ in a set of reference positions $POS_k$ and/or zones in the vicinity of the reference position.

Finally, other values can be collected, measured or calculated. By way of example, signal to noise ratio S/N values can be measured and recorded on a set of geographical positions $POS_k$.

According to another example, which can be complementary to the previous ones, values of ratios of signals transmitted in different spots by the satellite and received in a same position, such as for example the ratio $S_{44}/S_{24}$ calculated at the points $POS_k$ in spot $C_4$, can be measured and recorded. The positions $POS_k$ can be predefined positions upon defining the antenna pattern for example from the antenna reference orientation.

Further, the gateway 1 includes a calculation system, such as a calculator K, which can comprise a microprocessor. The latter makes it possible in particular to perform value comparisons, signal correlations, gain and/or phase calculations from reference data and from a predefined or smart algorithm.

According to an exemplary embodiment, the memory M and the calculator K can be located in a third-party equipment accessible from the gateway, for example from a communication interface. According to one example, the memory M and the calculator K used to perform some operations can be in a remote server accessible through a network connection.

According to an embodiment, transmitting the signals to the satellite is made by a plurality of transponders sharing their broadcast scheme and the frequencies used in order to limit interference in the uplinks.

Satellite

FIG. 1 represents a satellite SAT including a receiver for receiving signals from the gateway 1 such as a receiving antenna, a processor for processing the received signals to be broadcast depending on geographical zones, power amplifiers and at least one transmitting antenna. The satellite SAT is thus, in an embodiment, a broadcasting satellite, in particular for a multimedia content which is located on a geostationary orbit.

One interest of the method and of the device of the invention is that they can either be implemented with a satellite already in orbit without requiring a particular adaptation. Indeed, the invention deals with the gateway and methods enabling correcting signals for generating signals to the satellite which are already corrected to be taken into account.

Spot

FIG. 3A represents spots $C_2$, $C_3$, $C_4$ and $C_6$. Spots $C_2$, $C_4$ and $C_6$ are covered by a same frequency band $B_2$ defining a transmission channel. In the represented spot $C_3$ and in spots $C_1$, $C_5$, $C_7$ which are not represented in FIG. 3A, the spectral band is noted B1. In reality, when such a solution is deployed, the adjacent spots are always partially covering each other, but the filter templates ensure a decrease in the power levels received in the adjacent spots fulfilling required specifications.

On the other hand, bands B1 and B2 are generally determined such that there is no spectral coverage between two adjacent spots. Thus, the architecture makes it possible to ensure that the transmissions in a band of a given spot do not disturb the transmissions of a spot directly adjacent to the given spot.

Each geographical zone covered by a transmitting spot $C_i$ is also noted $C_i$ to designate it. Thus, in the present description, the transmitting spot and the zone covered by the spot are used interchangeably to simplify the description. The geographical zone comprises aerial zones and terrestrial zones included in the spot transmitting cone. Each geographical zone considered is covered such that terminals can receive, demodulate and decode the base band signal.

Interference and Noise

In each spot, the "equivalent isotropically radiated power" (EIRP), is optimised such that the signal is received for all the terminals of a given spot. Each terminal demodulates and decodes the received signals to process the base band signal.

The method of an embodiment of the invention enables the interference induced by the transmissions in a neighbouring spot to a given spot but not directly adjacent to the same to be partly processed, the transmissions sharing the same frequency band as the considered spot. In order to illustrate this, FIG. 3A enables the case set out to be better understood.

In the example of FIG. 3A, the transmissions of the satellite SAT to spot $C_2$ are noted $S_2$. These transmissions naturally cover spot $C_2$ but also extend beyond as illustrated by the hatched band $S_2$. The part of the signal of $S_2$ which is transmitted by the satellite and received in spot $C_2$ is noted $S_{22}$ and the part of the signal of $S_2$ which is transmitted by the satellite and received in spot $C_4$ is noted $S_{24}$, it corresponds to a parasitic residual signal.

The powers of the signal $S_2$ extending beyond spot $C_2$ are reduced but are a low-power residual signal.

Taking the example of FIG. 3A, the method of an embodiment of the invention comprises a step in which the determination of the signals to be transmitted in a given spot $C_4$ is performed. The wanted signal $S_{44}$ is known and a correcting signal $S_{24C}$ is calculated using the method of the invention. The correcting signal $S_{24C}$ is calculated from the transmitted signal $S_{22}$ for being transmitted in a neighbouring spot $C_2$ and which is an interference source in the region of spot $C_4$. The latter signal can thereby be noted $S_{24}$, meaning that it is for spot $C_2$ but that part of the signal is interfering in the vicinity of spot $C_4$ or in spot $C_4$. $S_{22}$ is thus the signal transmitted to the spot $C_2$ and received at spot $C_2$ and signal $S_{24}$ is the signal transmitted to spot $C_2$ and received in a given position of spot $C_4$.

The following table enables the references chosen to be set:

|  | Signal transmitted in spot $C_1$ | Signal transmitted in spot $C_2$ | Signal transmitted in spot $C_4$ | Signal transmitted in spot $C_v$ |
| --- | --- | --- | --- | --- |
| Signal received in spot $C_1$ | $S_{11}$ | $S_{21}$ | $S_{41}$ | $S_{v1}$ |
| Signal received in spot $C_4$ | $S_{14}$ | $S_{24}$ | $S_{44}$ | $S_{v4}$ |
| Signal received in spot $C_V$ | $S_{1v}$ | $S_{2v}$ | $S_{4v}$ | $S_{vv}$ |

In the exemplary embodiments of FIGS. 3A to 5B, spots $C_2$ and $C_4$ are chosen as spots considered as neighbouring spots, even if they are not directly adjacent, and sharing a same frequency band. $C_4$ is the spot in which the wanted signal is sent, the terminal is located at the border of spot $C_4$ and the wanted signals transmitted in spot $C_2$ are considered as potential interference at the terminal position.

In considering the generalisation of neighbouring spots, spots $C_1$ and $C_V$ are chosen as spots considered as neighbouring spots, even if they are not directly adjacent, and sharing a same frequency band. $C_V$ is the spot in which the wanted signal is sent, the terminal is located at the border of spot $C_V$ and the wanted signals transmitted in spot $C1$ are considered as potential interference at the terminal position.

Terminal $T_1$, which switches from spot $C_4$ to spot $C_3$ but which is still in the inner border of spot $C_4$, is configured to receive signals $S_{44}$ transmitted in band B2. It is noticed that the zone covered by the transmissions $S_2$ transmitted in the same band B2 is likely to receive (or receiving) signals intended to neighbouring spots and considered as interference for the terminal $T_1$ receiving a signal $S_{44}$. The position of terminal $T_1$ is noted $POS(T_1)=POS_1$.

Consequently, the ratio $S_{44}/S_{24}$, at the point where terminal $T_1$ is located, is dimensioning to qualify disturbance related to the interference of the signals received at the border of spot $C_4$. If the interference at this point is called $I_1$, $I_1=S_{24}(POS_1)$, by considering only interference from signals of the satellite.

If the radio noise is noted N, the signal to noise ratio in spot $C_4$ can be considered: $S_{44}/N$. By considering the disturbances related to the interference received at position $POS_1$, the general degradation of signal $S_{44}$ can be considered as the ratio $S_{44}/(N+I_1)$.

Reference Signals/Antenna Pattern

The method of an embodiment of the invention comprises taking known values of powers of signal received in some positions defined with respect to a given antenna orientation of the satellite into account. This is called antenna pattern or transmitted or received power mapping of an antenna.

Thus, when a terminal is in a position $POS_1$, a received power for a transmitted power reference level is known by recording the antenna pattern. This pattern enables the powers received from signals transmitted for a reference signal to be known in each point of a spot. Thus, when terminal $T_1$ passes from a first position $POS_1$ to a second position $POS_2$, the power received from a same signal transmitted by the antenna of the satellite SAT could have changed.

The antenna pattern can be carried out so as to associate for each power level measured at each calibration point, a phase value of the received signal.

Thus, the antenna pattern of the satellite SAT, which is carried out for example during a calibration prior to starting up the broadcasting satellite, enables a set of values $\{P_i; \Phi_i\}$ to be obtained for a set of positions POSi.

It is noted:
$P_2(POSi)$: the power of the signal received $S_2$ at point POSi and;
$\Phi_2(POSi)$: the phase of the signal received at position POSi.

In the document, signal Si and its received power $P_i$ are indifferently employed at point POSi. "Si" thus designates the signal power at point $POS_i$ as well.

The antenna patterns can be made for the signals transmitted in each spot. Thus, for a given reference signal $S_{2R}$ or $S_{4R}$, a reference power $P_{R(POSk)}$ received at a position $POS_k$ of spot $C_2$ or a region of the vicinity of spot $C_2$ can be measured. In the case of the invention, one interest is to know the received power at a position of spot $C_4$ of a reference signal $S_R$ transmitted to spot $C_2$. A reference signal intended to spot $C_4$ can thus be called signal $S_{4R}$ and a reference signal intended to spot $C_2$ called signal $S_{2R}$. The reference signal $S_{2R}$ can be received in the vicinity of spot $C_4$, in which case it is considered as an interfering signal.

Insofar as the antenna patterns are known for each spot, it is thereby possible to calculate and even to measure a similar pattern of the signal to interference ratio: S/I at a given position, the interference being generated by a signal to another spot than the spot in which the wanted signal is received.

For example, the ratios $S_{44R}/S_{24R}$ for reference signals transmitted by the antenna of the satellite SAT can be determined or evaluated for a set of positions $POS_i$ included in spot $C_4$ and in its close vicinity.

If it is considered that a memory includes calibration data of the antenna pattern(s) including:
powers received from reference signals $S_{44R}$ intended to spot $C_4$ and received at points of spot $C_4$ and in the vicinity thereof and;
powers received from reference signals $S_{24R}$ intended to spot $C_2$ and received at points of spot $C_4$ or in the vicinity thereof,
then, the values of ratios $S_{44R}/S_{24R}$ can be deduced in a number of given geographical positions $POS_k$ as a result of setting the antenna pattern(s).

A benefit of the gateway or of the method of an embodiment of the invention is to take advantage of known values of transmitted powers radiated by the antennas upon calibration to set the antenna patterns. These values are reused in generating signals by the gateway for each carrier addressed to a given spot depending on a known position of a terminal and a supposed interference level at this position.

To that end, the method and the gateway 1 of the invention enable a power value $P_{2R}(POS_k)$ of the signal $S_{2R}$ and a phase value $\Phi_{2R}(POS_k)$ at position $POS_k$ and transmitted by the antenna of the satellite SAT to spot $C_2$ to be taken into account. The reference signal $S_{2R}$ then enables a correcting signal $S_{44C2}$ transmitted with signal $S_{44}$ to spot $C_4$ to be built. The signal thus transmitted is noted: $S_{44}'=S_{44}+S_{44C2}$.

A benefit is that the method of the invention can be implemented in the gateway 1 of the invention without modifying components and without particular updating of the software of the satellite SAT or of the terminal $T_1$.

A benefit of an embodiment of the invention is that minimising the ratio S/(N+I) occurs in air by recomposing signals transmitted by the gateway 1 and thus by those which will be retransmitted by the satellite to the ground.

Beforehand, upon calibrating the antenna, the interference level caused by the wanted signal $S_{24}$ at position POS1 could have been evaluated from reference signals.

According to an embodiment of the invention, upon implementing the method of the invention, the calculator has, for example, made it possible to assess that a threshold had been crossed by comparing the values of power ratios at a given point in order to automatically trigger the generation of a correcting signal.

The method then comprises calculating the correction to apply to locally compensate for the interference produced by the parasitic signal $S_{24}$ and generates the correcting signal $S_{44C2}$.

The method then comprises generating a combined signal between the wanted signal $S_{44}$ and the correcting signal $S_{44C2}$ to the satellite SAT to be broadcast in spot $C_4$. This signal resulting from a combination enables the interference caused by signal $S_{24}$ to be reduced.

Steps of the Method

Taking a Position of a Terminal into Account

Figure 7:
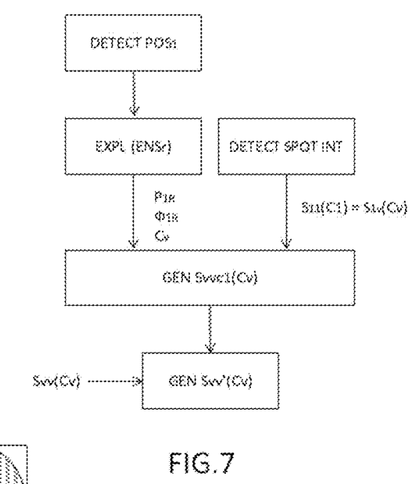
FIG. 7: an example of steps of the method of the invention according to an embodiment of the invention.

More generally, the method is described with regard to FIG. 7 in which a position $POS_1$ is received by the gateway 1. This position can be regularly received through an equipment collecting a set of positions of terminals. According to one embodiment, the method of the invention includes a step of receiving and analysing a set of positions of mobile terminals.

The method makes it possible to detect whether a position is in a zone of a spot, for example located at the border of the spot, that is in a zone likely to be disturbed (or being disturbed) by the interference from a carrier transmitted by the satellite and intended to another spot. The step is noted DETECT $POS_1$ in FIG. 7. This step thus makes it possible to discriminate positions of terminals that may be susceptible of disturbance. When a terminal is located in the centre of a spot, the power received from the signal intended to this spot is such that the ratio S/I is large enough for the method of the invention not to apply a correcting signal. Consequently, the analysis of the position of a terminal is decisive in applying the method of the invention or not.

Looking up Reference Data

The method then comprises a step of looking up reference data in a database referencing a set of calibration values. This step is noted EXPL (ENSr) in FIG. 7. This step makes it possible to exploit at least one received power value at a position close to or identical to position $POS_1$ of the terminal. The exploited received power values relate to those of a reference signal intended to another spot than that in which the terminal is located and likely to cause (or causing) interference in the vicinity of this point. This is the case of a signal intended to spot $C_2$ and disturbing wanted signals at the border of spot $C_4$. Further, the values also relate to the received powers of a reference signal intended to spot $C_4$ and the measurement of which is known at the border of spot $C_4$. The latter two power values enable us to exploit a reference ratio S/I at the border of spot $C_4$.

According to an embodiment, the method includes a step DETECT SPOT INT enabling the potentially most interfering spot to be discriminated depending on the position of terminal T1. This step can be performed together with the step of exploiting the reference values EXPL (ENSr). A segmentation of the zones can for example be preset enabling for example a zone at the border of a given spot to be associated with a neighbouring spot the transmissions of which are potentially disturbing.

Signal $S_1$ can cause interference to the received signals $S_{VV}$ of a terminal $T_1$ located at a position $POS_1$ of a neighbouring spot $C_V$. Signal $S_1$ is then considered as an interfering signal, it is noted $S_{1V}$, at position $POS_1$ of the neighbouring spot $C_V$ (see notations in the table below).

In order to measure whether interference can occur in the region close to terminal $T_1$, the method thus makes it possible to exploit signal to interference power ratios S/I at point $POS_1$ which are known for a reference signal $S_R$ that has enabled the antenna pattern to be defined.

In the same way, in the general case, the power ratios between:

the power of a reference signal $S_{VVR}$ transmitted by the satellite and intended to the neighbouring spot $C_V$ and;

the power of a reference signal $S_{1VR}$ intended to a neighbouring spot $C_1$ of spot $C_V$ and likely to create (or creating) interference in the vicinity of point $POS_1$, position $POS_1$ being located in the neighbouring spot $C_V$, can be defined and exploited since these ratios can be determined.

The power of signal $S_1$ at point $POS_1$ located in spot $C_V$, that is $S_{1V}$, is noted $P_1(POS_1)$. The power of signal $S_V$ t point $POS_1$ is noted $P_V(POS_1)$, then, the ratio $P_1/P_V(POS_1)$, also noted $S_{11}/S_{1V}$ enables whether a correcting action has to be conducted or not to be evaluated.

Correcting Signal

The method of an embodiment of the invention then makes it possible to generate a correcting signal $S_{VVC1}$ for being transmitted in spot $C_V$. This step is noted GEN $S_{VVC1}(C_V)$ in FIG. 7, $S_{SVVC1}$ designates the correcting signal transmitted to spot $C_V$ to correct interference effects caused by signal $S_{1V}$. This step enables a reply of signal $S_1$ to be generated by adapting its amplitude and phase to obtain an interference cancelling effect in the vicinity of position $POS_1$ in spot $C_V$, or at least a decrease in their effects. This can also be called signal destructing interference causing interference in the vicinity of position $POS_1$.

The correcting signal $S_{VVC1}$ is thus built from the reference signal $S_{11R}$ intended to spot $C_1$ by applying to it an amplitude substantially equal to the amplitude of signal $S_{11}$ transmitted to spot $C_1$ or in other words, equal to the amplitude of signal $S_{1V}$ transmitted to $C_V$. Further, the correcting signal $S_{VVC1}$ is 180° phase shifted to the phase of the reference signal $S_{1VR}$ chosen in the set of reference values ENSr at position $POS_1$, or a close position. According to an embodiment, the method does not take a phase correction to apply in order to switch from the reference signal $S_{1VR}$ to the transmitted signal $S_{1V}$ into account.

It is reminded that the values of the correcting amplitude and the correcting phase are calculated from reference data of a reference signal $S_R$, a reference amplitude and a reference phase shift of which are known at a given point. Since the carrier actually transmitted at a given instant and the configuration of the satellite are known, the parameters enabling data relating to the reference signal $S_{1VR}$ to be transposed to that relating to the transmitted wanted signal $S_{1V}$ can thereby be readily determined.

According to improved embodiments, the phase shift introduced in the correcting signal $S_{1VC}$ takes phase shift effects of signal $S_{1V}$ into consideration in the transmitting chain such that the cancellation is maximum at position $POS_1$.

The method of an embodiment of the invention finally includes a step of generating the signal intended to spot $C_v$: $S_{vv}'$ which includes a combination of the signal initially intended to spot $C_V$: $S_{VV}$ and of the correcting signal $S_{VVC1}$.

The signal transmitted by the gateway is thus a combined signal:

$$S_{VV}' = S_{VV} + S_{VVC1}$$

where $S_{VV}$ is the signal initially transmitted to spot Cv and $S_{VVC1}$ is the correcting signal for removing part of the interference at position $POS_1$ from signal $S_1$ transmitted in spot $C_1$.

The combination can be made once the signals are each independently transmitted by coherent construction over the air.

Taking Adjustment to Reference Values into Account

According to an embodiment, when reference values ENSr of powers and phases have been measured during a calibration operation, it is thereby possible to apply a parameter for exploiting transmissions aiming at adapting the reference values to a context of use.

To that end, a ground radio device can be associated with gateway 1 in order to dynamically measure phase $\Phi_{VV}$ of the signal received (or $\Phi_{44}$ in the case of FIG. 3A) and the power of the received signal $S_{VV}$ (or $S_{44}$ in the case of FIG. 3A) on at least one geographical point POSi. This measurement enables the actual phase and power to be known during the phase of exploiting the satellite in a given point. A drawback is that the measurement at the desired point should be performed.

However, some measurements performed at chosen points enable the values of the reference data to be adapted at will with one of the measured values enabling data obtained upon calibrating the antenna to be tuned.

In the case of the example of FIG. 3A, let us consider a first reference phase shift $\Phi_{2R}(POS_i)$ at point $POS_i$ of 70° measured upon carrying out the antenna pattern for the transmissions in spot $C_2$ and a second reference phase shift $\Phi_{2R}(POS_k)$ at point $POS_k$ of 30° measured upon carrying out the antenna pattern for the transmissions in spot $C_2$.

If the radio device is positioned at position $POS_k$ and that an actual phase shift value is measured at 33° instead of 30° upon receiving the signal transmitted by the satellite SAT to spot $C_2$, it is noticed that an error of 3° is present in the phase of the receiving signal $S_{22}(POS_k)$ toward that of the reference signal $S_{22R}(POS_k)$. This offset can be related to the situation of the satellite SAT, its configuration or a given transmission context. It is thereby possible to extrapolate this 3° correction on the measurement of the phase $\Phi_{2R}(POS_i)$ at point $POS_i$ that can be assumed in a same geographical region as point $POS_k$.

Thus, gateway 1 of an embodiment of the invention can take a dynamic correction parameter into account in addition to a static correction parameter only calculated from reference values resulting from an antenna pattern pre-calibration.

Figure 3B:
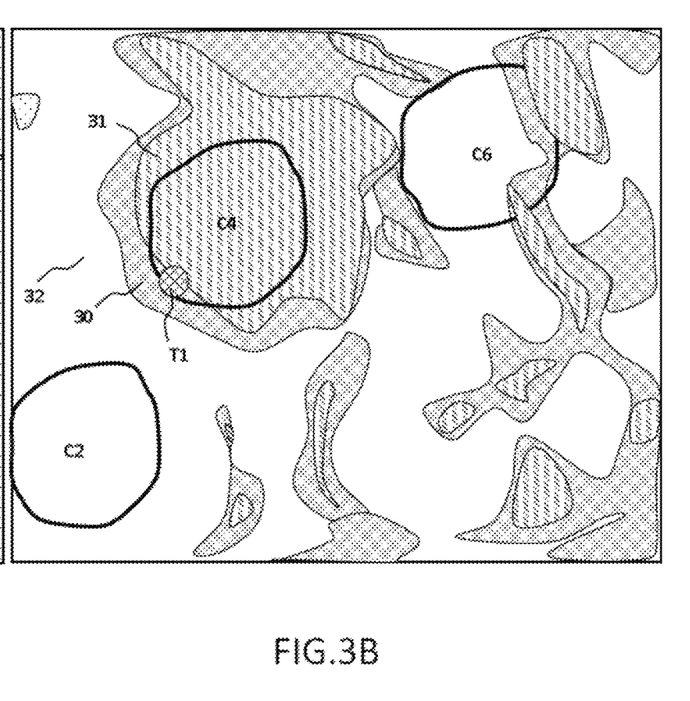
FIG. 3B: an example of representation of the ratio level between the power of the wanted signal received in spot 4 and of the power of the interference caused by the wanted signal transmitted in spot 2 measured from spot 4 without implementing the device of the invention.

FIG. 3B represents the signal to interference ratio, noted S/I, at spot $C_4$ considering that the interference is due to the transmissions in spot $C_2$, it can also be noted $S_{44}/S_{24}$. Zone 31 designates a zone in which the ratio S/I is higher than a given threshold for which the transmissions are deemed satisfactory. Zone 30 designates a zone in which the interference is such that the ratio S/I is lower than a threshold for which it is considered that the interference degrades the transmissions and that a correcting signal should be generated according to the method of the invention. In zone 32, the ratio S/I is theoretically low.

The case of FIG. 3B thus represents a terminal $T_1$ in a position for which a correcting signal could be applied to improve the quality of the received signal. But, it can be noted that a consequence of the application of such a correcting signal is that it is applied to the entire region of spot $C_4$.

Potentially, the application of a correcting signal $S_{44C1}$ improving the quality of the received signal $S_{44}'$ at position $POS_1$ of terminal $T_1$ can deteriorate the transmissions in other positions of SPOT $C_4$. The application of the correcting signal can thus take a compromise criterion into account between the improvement obtained in position $POS_1$ and the deterioration at one or more other positions of spot $C_4$.

Figure 6A:
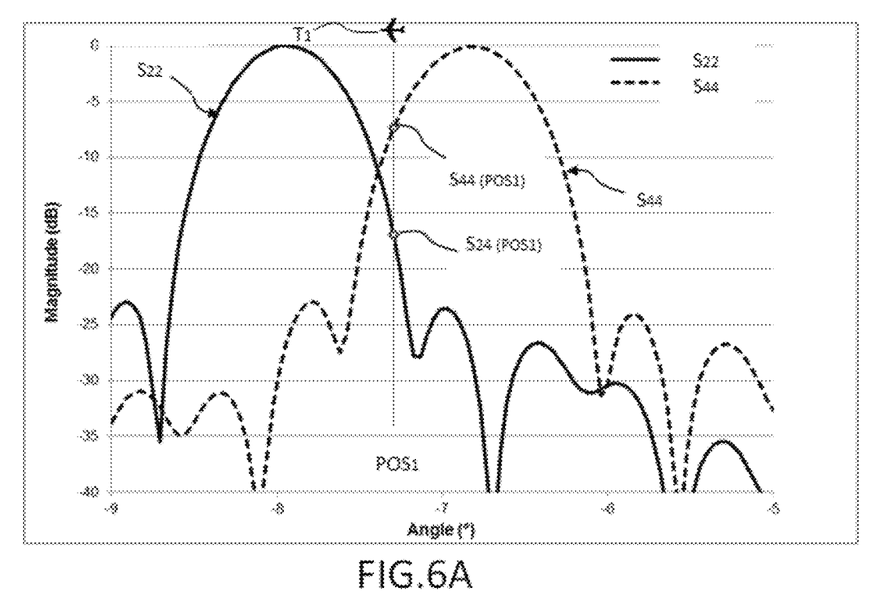
FIG. 6A: an example of representation of an aircraft located in a border of a spot $C_4$, the aircraft being represented with the superimposition of the levels of signals from the power of the wanted signal received in spot $C_4$ and the power of the interference caused by the wanted signal transmitted in spot $C_2$ measured from spot $C_4$.

FIG. 6A represents the superimposition of the power curves of signals received at an angle measured with respect to the satellite. The direction of the terminal $T_1$ in the reference frame of the satellite can be defined with respect to a reference angle of the antenna orientation. As a first approximation, a position of an aircraft in the sky is substantially equivalent to a position calculated on the ground in view of the altitude of the satellite generally positioned on a geostationary orbit.

Two curves represent the signals transmitted by the satellite in spots $C_2$ and $C_4$, respectively $S_2$ and $S_4$. The signals represent lobes which partially cover each other. In the case of FIG. 6A, the aircraft $T_1$ is in a position $POS_1$ in spot $C_4$. The signals $S_{44}$ transmitted and received in spot $C_4$ are likely to be disturbed (or being disturbed) by the signals transmitted in spot $C_2$, the signal considered as interfering is noted $S_{24}(POS_1)$.

Upon reading FIG. 6A, it is understood that the ratio $S_{44}/S_{24}$ low at position $POS_1$ of the aircraft.

Figure 4A:
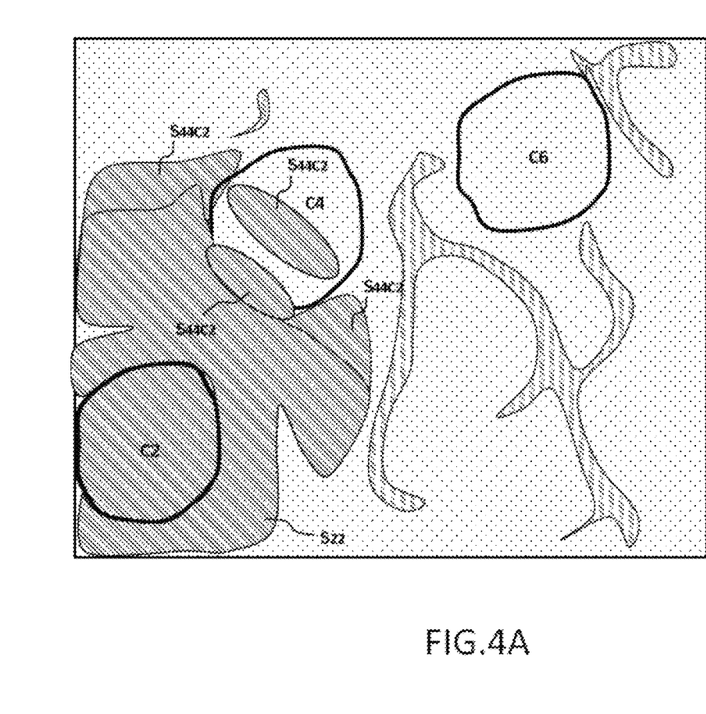
FIG. 4A: an example of representation of the power level of the interference generated by transmitting a wanted signal in spot 2 and measured from spot 4 with a first implementation of the device of the invention.

FIG. 4A represents a case in which the correcting signal $S_{44C2}$ is applied. This correcting signal naturally causes a coverage extension of signal $S_{22}$. FIG. 4A illustrates that a part of signal $S_{44C2}$ is generated in the middle of the spot $C_4$ or outside the same. This is quite normal because the correcting signal is sent in spot $C_4$.

Figure 4B:
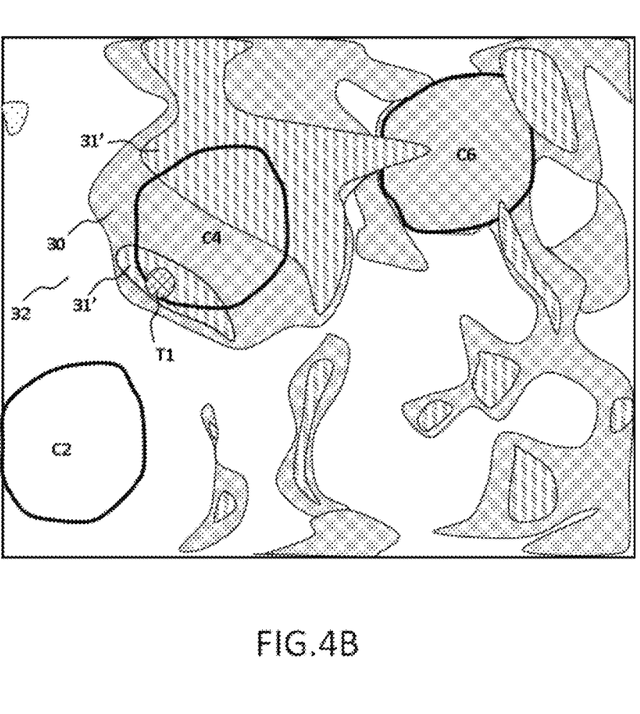
FIG. 4B: an example of representation of the level of the ratio between the power of the wanted signal received in spot $C_4$ and the power of the interference caused by the wanted signal transmitted in spot $C_2$ measured from spot $C_4$ with a first implementation of the device of the invention.

FIG. 4B represents the ratio S/I, that is the ratio—$S_{44}'/S_{24}$. It is observed that at the border of spot $C_4$, terminal $T_1$ is in a portion 31' having a ratio higher than a threshold. Consequently, the introduction of the correcting signal has enabled the reception of the wanted signal $S_{44}$ to be improved at terminal $T_1$. On the other hand, it is noticed that the portion 30 in which the wanted signal of spot $C_4$ is transmitted is degraded because of the presence of the correcting signal. It is considered in this embodiment, that the situation of the terminal is prevalent on the set of the positions of the spot.

Figure 6B:
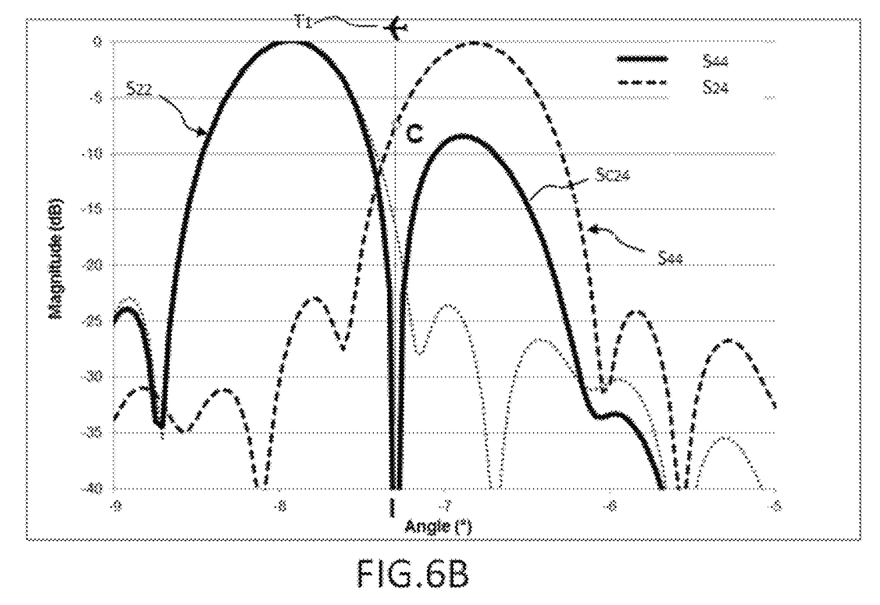
FIG. 6B: an example according to FIG. 6A with a processing according to an embodiment of the method of the invention.

FIG. 6B represents the lobes of the signals of FIG. 6A after applying the method of the invention. The application of the method of an embodiment of the invention thus enables a better ratio S/I to be obtained at position $POS_1$.

It is also observed that the generation of the correcting signal $S_{44C2}$ generates a lobe in spot $C_4$. The method of an embodiment of the invention thus possibly enables a decision parameter to be taken into account in order to apply the correcting signal or not. By way of example, the presence of other terminals in spot $C_4$ can be taken into account in order not to generate a correcting signal. According to one embodiment, the number of terminals and their position in a spot can be taken into account.

Figure 5A:
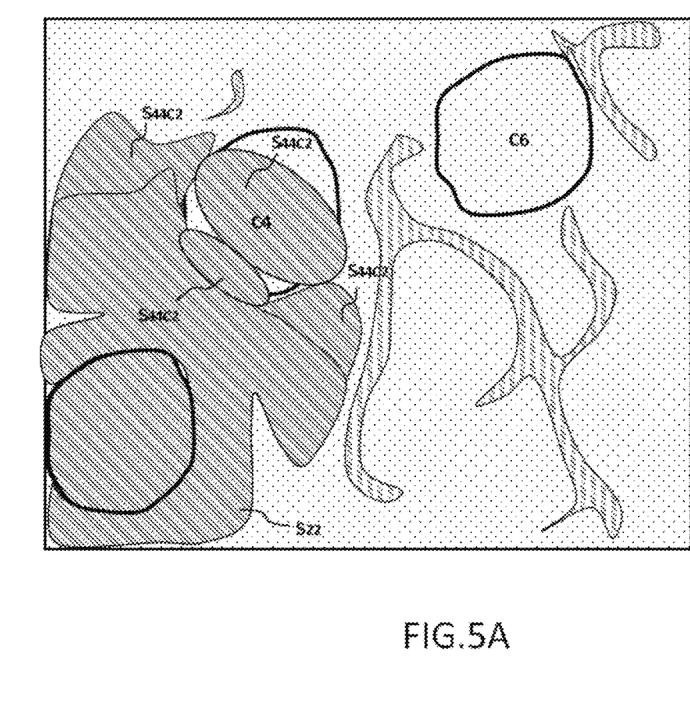
FIG. 5A: an example of representation of the power level of the interference generated by transmitting a wanted signal in spot $C_2$ and measured from spot $C_4$ with a second implementation of the device of the invention.
Figure 5B:
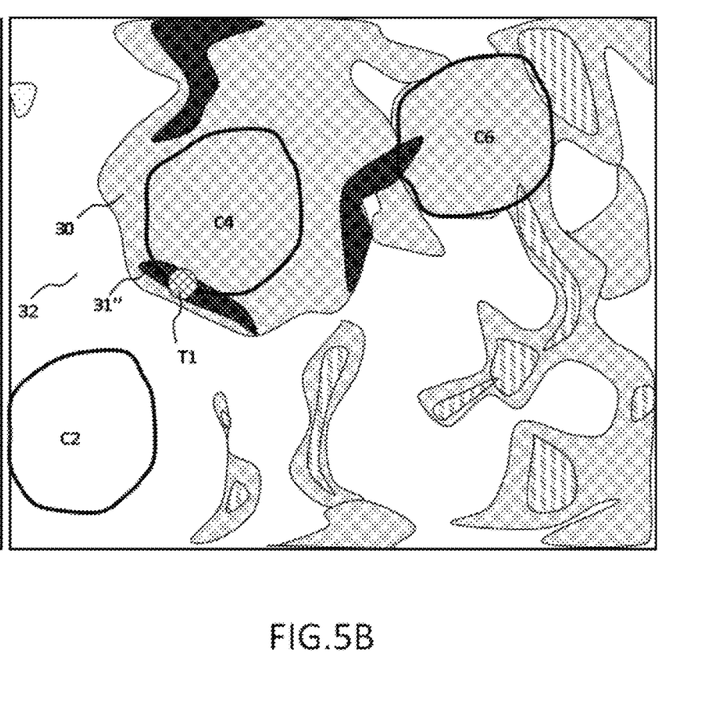
FIG. 5B: an example of representation of the level of the ratio between the power of the wanted signal received in spot $C_4$ and the power of the interference caused by the wanted signal transmitted in spot $C_2$ measured from spot $C_4$ with a second implementation of the device of the invention.

FIGS. 5A and 5B represent cases in which the correcting signal enables a very good ratio S/I to be obtained in zone 31″, at the border of spot $C_4$. The correcting signal $S_{44C2}$ enables, in this case, a better result to be obtained, that is a reception at position $POS_1$ of a wanted signal $S_{44}'$ that is less disturbed by signal $S_{24}$.

However, by comparing FIGS. 4B and 5B, it is observed in FIG. 5B that an upper zone 31′ of FIG. 4B has disappeared and that zone 30 covers a larger part of spot $C_4$ in FIG. 5B. Thereby, it is understood that a better processing in position $POS_1$ can degrade the quality of the received signal in other positions of spot $C_4$.

According to an embodiment, an optimisation can be made by taking two neighbouring spots into consideration. For example, the processing of the signals transmitted in spot $C_4$ can take into account the transmissions, considered as generating interference, in spots $C_2$ and $C_6$. It is reminded that the latter transmissions are in the same frequency band as the transmissions intended to spot $C_4$. According to an embodiment, the transmission of signal $S_{44}$ can thereby be made together with the generation of two correcting signals: $S_{44C2}$ and $S_{44C6}$. This configuration can be chosen when corrections have to be applied at the same moment at two different positions, for example at position $POS_1$ and position $POS_2$. This configuration generally generates a deterioration in the received signal at the other positions of spot $C_4$. In particular, in the positions other than position $POS_1$ and its vicinity and position $POS_2$ and its vicinity. A compromise should be made by taking the environment of the terminals of spot $C_4$ into consideration.

A benefit of the invention is that it allows a "tailored" processing of the signal transmitted at one or more positions of terminals. Another benefit of the invention is to manage terminals with priority to others in order to make it sure that the transmissions for a priority terminal can be set.

Finally, another benefit is to benefit from a known antenna pattern in order to generate a correcting signal dynamically as a function of a position of a terminal.

Another benefit is to allow a local reduction in the interference without intervening on the terminals or on the satellite. The invention requires modifications only on the gateway.

The invention claimed is:

1. A communication device for transmitting a plurality of signals to a satellite from a transmitter, said transmitter including at least one transmitting antenna and a modem, each of the signals transmitted by the device being for being addressed to a given transmitting spot via the satellite, a transmitting spot having a predefined geographical coverage of an antenna of the satellite, said communication device including a memory including a set of reference values of powers and phases of at least a first reference signal received at different points of at least one transmitting spot, a first wanted signal being transmitted in a first spot and generating an interfering signal in a neighbouring spot, the transmitter adapted to generate at least one wanted neighbouring signal for being transmitted in a neighbouring spot of the first spot and being disturbed by the interfering signal, the transmitter adapted to generate a first correcting signal from the first transmitted signal and at least a first phase value and a first power value of the set of reference values, said phase and power values being chosen depending on at least one determined geographical position in the neighbouring spot, said transmitter adapted to transmit a combination of the first correcting signal and the wanted neighbouring signal in order to generate a corrected neighbouring signal to the satellite, said corrected neighbouring signal being for being transmitted in the neighbouring spot.

2. The communication device according to claim 1, wherein at least one part of the first signal and at least one part of the neighbouring signal are included in a same frequency band.

3. The communication device according to claim 1, wherein the set of reference values includes, for a set of given positions covering at least one neighbouring spot of a first spot:
   a received power value of a first reference signal for each of the given positions,
   a phase value of the first reference signal received for each of the given positions;
   a reference ratio between a power of a reference signal transmitted in the neighbouring spot and a power of a second reference signal transmitted in the first spot, said ratio being calculated for the set of the given positions.

4. The communication device according to claim 3, wherein the first correcting signal is determined depending on the reference values of the determined geographical position and of a plurality of further positions in the neighbouring spot.

5. The communication device according to claim 1, wherein the values of the reference ratio lower than at least one threshold for a set of given positions of a same geographical region define at least one critical zone of a spot.

6. The communication device according to claim 5, further comprising a calculator that is adapted to automatically determine a command to generate a first correcting signal when the determined geographical position is in a critical zone or when the value of the reference ratio is lower than a threshold at the determined geographical position.

7. The communication device according to claim 6, wherein the calculator further conditions the generation of the command of a first correcting signal to the value of a criterion calculated depending on the power and/or phase values of the wanted signal transmitted in the neighbouring spot and of the wanted signal transmitted in the first spot by the transmitter.

8. The communication device according to claim 7, wherein the calculator is adapted to automatically determines the power and/or phase values of the wanted signal transmitted in the neighbouring spot and of the wanted signal transmitted in the first spot by the transmitter depending on the proximity of the determined geographical position with positions at which the reference ratio is lower than a threshold.

9. The communication device according to claim 1, further comprising a calculator that is adapted to generate a correcting signal upon receiving information indicating the presence of a terminal in the proximity of a determined geographical position.

10. The communication device according to claim 1, wherein the phase of the first correcting signal substantially corresponds to the opposite phase of the phase of a reference signal received at or substantially close to the given geographical position and recorded in the memory.

11. The communication device according to claim 1, wherein the amplitude of the first correcting signal is calculated depending on the power value of the first reference signal received at the determined geographical position and recorded in the memory.

12. The communication device according to claim 1, wherein the determined geographical position corresponds to an antenna direction of the satellite relative to a reference orientation, said direction being coupled with a known mean distance of the satellite for calculating a gain and a phase of the reference signal.

13. A method for processing interference comprising:
- acquiring a first position from an input interface and a calculator;
- generating a first wanted signal to a first spot creating interference on a neighbouring spot, said first wanted signal being sent by a communication device and passing through a satellite;
- generating a neighbouring wanted signal for being transmitted in a neighbouring spot of the first spot and passing through a satellite;
- generating a first correcting signal from:
  - the first wanted signal;
  - a phase value associated with the first given position;
  - a power value associated with the first given position, said power and phase values being chosen from a predefined set of reference values,
- generating and transmitting a corrected neighbouring signal to the neighbouring spot of the first spot and passing through a satellite, said corrected neighbouring signal being obtained by a linear combination of the neighbouring signal and of the correcting signal.

* * * * *